Patented Mar. 11, 1930

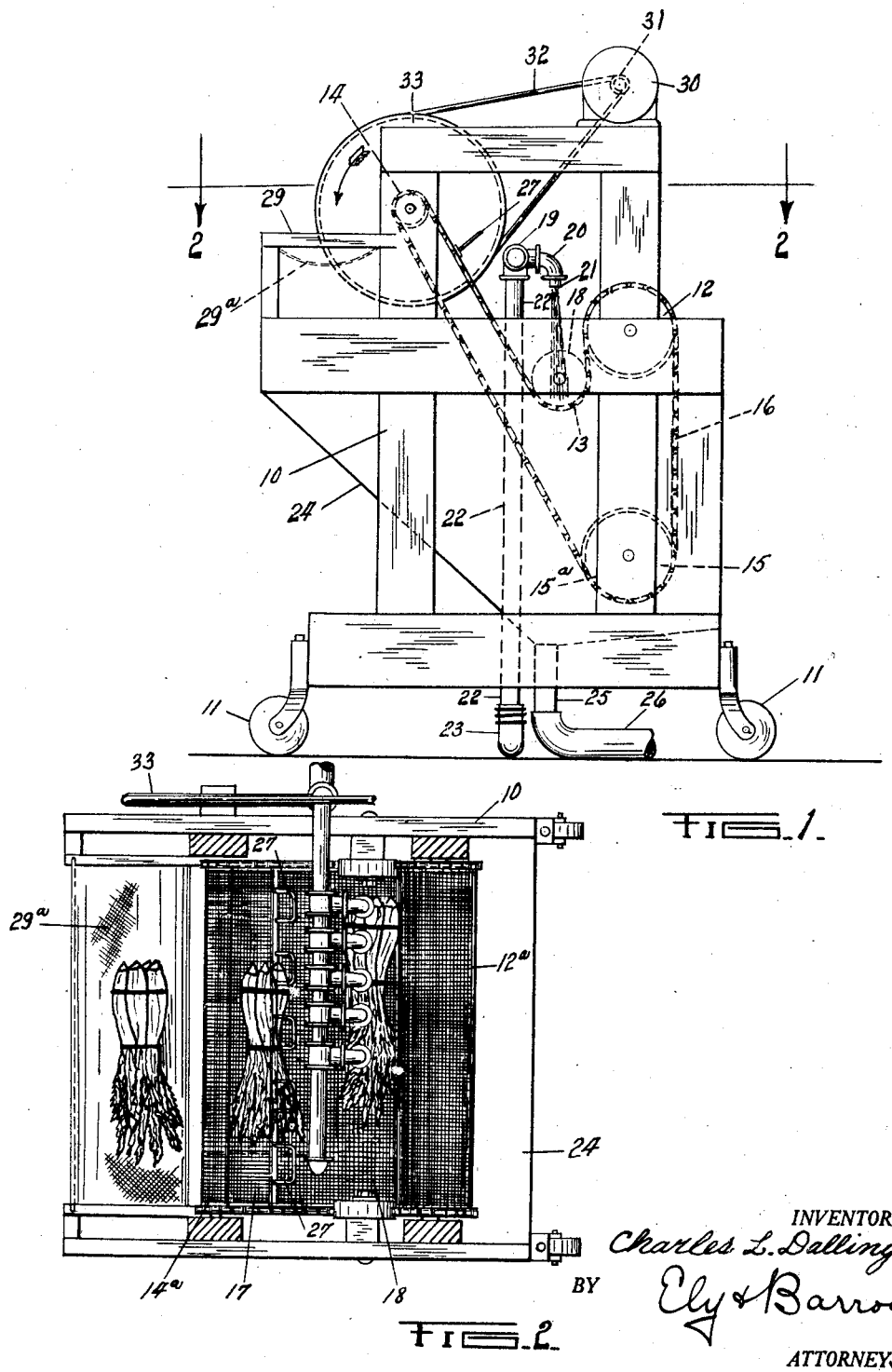

1,750,612

UNITED STATES PATENT OFFICE

CHARLES L. DALLINGA, OF AKRON, OHIO

VEGETABLE WASHER

Application filed January 16, 1929. Serial No. 332,814.

This invention relates to vegetable washers such as may be used for washing celery and green vegetables, root vegetables, fruits, etc.

The general purpose of the invention is to provide a machine in which the vegetables will be thoroughly washed in a short time and without injury to the same.

Specifically the invention has for its object the provision of means for tumbling or rotating the produce, means for spraying the produce with water while being tumbled or rotated, and means for removing the produce from the washer after a predetermined period of washing to avoid injuring the same.

The foregoing purposes and objects of the invention are attained in the vegetable washer illustrated in the accompanying drawings and described below. It is to be understood that the invention is not limited to the specific form thereof shown and described.

Of the accompanying drawings,

Figure 1 is a side elevation of a washer embodying the invention; and

Figure 2 is a plan thereof.

Referring to the drawings, the numeral 10 represents a suitable frame which preferably is mounted on rollers or castors 11, 11 so as to be portable. At each side of the device there is provided a set of sprockets 12, 14 and 15 over which is trained chains 16 and rollers 13 are arranged to have the upper stretches of the chains 16 trained downwardly thereunder and a foraminous belt or web 17 or other suitable traveling web from which water may effectively drain to carry off the dirt washed from the vegetables is arranged between and secured to said chains whereby said belt is adapted to be continuously driven by the chains with a pocket 18 provided in the upper stretch of said belt in which the vegetables are placed to be washed. Drums 12$^a$, 14$^a$ and 15$^a$ to the ends of which sprockets 12, 14 and 15, respectively, are secured, are journaled in the frame to support the width of the belt 17 between the sprockets.

A water spraying device is arranged over the pocket 18 including a header 19 to which elbows 20 are connected as shown and which elbows are provided with any suitable spray nozzles at 21. By this construction it is possible to turn the elbows in the header to direct the spray either straight down or at any desired angle downwardly transversely of the pocket. A supply pipe 22 mounted in the frame may be connected to a suitable source of water by a hose or other conduit 23. A drain pan 24 may be supported in the frame under the entire washer to catch the dirty water and deliver it through a drain pipe 25 and hose or other conduit 26 if desired or necessary to a sewer or other point where the used water may be disposed of.

To provide for removing the vegetables from the pocket after a predetermined period of washing, the belt 17 is provided at one or more points, (only one being indicated in the specific device shown) with suitable conveying lugs 27 projecting upwardly from the surface of the belt. The lugs may comprise as shown a series of open loops so as not to have any tendency to trap and elevate water out of the pocket.

Any suitable receptacle or conveyor may be provided to receive the washed vegetables as they are passed off the belt 17 as lugs 27 pass over the drum 14$^a$. A tray 29 is illustrated in the drawings for this purpose, said tray having a foraminous or draining bottom at 29$^a$ to permit drainage from the vegetables deposited thereon.

The machine may be driven by a motor 30 on the shaft of which is a pulley 31 having a driving belt 32 trained thereover and over a driven pulley 33 secured on the shaft of sprockets 14 and drum 14$^a$. Other suitable motive power may, of course, be utilized for this purpose.

In use, the belt 17 is driven continuously, water is sprayed continuously into pocket 18 and the vegetables to be washed are intermittently inserted in pocket 18 just after lugs 27 pass upwardly out of said pocket. Due to the lifting tendency of the upwardly directed stretch of belt extending up to drum 14$^a$ and the action of gravity, the produce depending upon the character thereof is tumbled or rotated while being sprayed as will be understood. In the case of bunches of celery, for example, as illustrated in the drawings, these will be rotated under the spray and due to the rotation and force of the spray the dirt will effectively be washed out of the bunched celery.

The washing action on the vegetables inserted in the pocket continues until the lugs 27 again pass through the pocket when these lugs hold the washed vegetables on the belt and cause them to be conveyed up to the tray at 29. As the washed vegetables are thus lifted out of the pocket, other vegetables to be washed are inserted therein and so on.

It will be seen that by varying the speed of the drive and by varying the length of belt 17 or the number of sets of lugs 27 employed thereon or both, it will be possible to secure any determinate period of treatment for the vegetables and since all the vegetables are removed from the pocket after treatment there is no danger of part of the vegetables receiving more treatment than others by remaining in the washer too long such as might cause injury thereto.

As is apparent from the foregoing, a simple, inexpensive, but effective vegetable and fruit washer has been provided by the invention. Obviously modifications thereof may be resorted to without departing from the spirit thereof or the scope of the appended claims.

What is claimed is:—

1. A vegetable washer comprising a belt from which water may drain to effectively carry dirt therefrom, means over which the belt is trained to form a pocket therein to receive and support the vegetables, means for directing a spray into the pocket, means to drive the belt whereby the vegetables will be tumbled or rotated in the pocket while sprayed, conveying lug means so mounted on the belt as to pass through said pocket at intervals to remove the washed vegetables from the pocket after repeated tumbling of the vegetables therein, a tray having a draining bottom to receive the washed vegetables from the belt, and a drain pan under the pocket and tray.

2. A vegetable washer comprising a belt from which water may drain to effectively carry dirt therefrom, means over which the belt is trained to form a pocket therein to receive and support the vegetables, means for directing a spray into the pocket, means to drive the belt whereby the vegetables will be tumbled or rotated in the pocket while sprayed, conveying lug means so mounted on the belt as to pass through said pocket at intervals to remove the washed vegetables from the pocket after repeated tumbling of the vegetables therein, and a tray having a draining bottom to receive the washed vegetables from the belt.

3. A vegetable washer comprising a belt from which water may drain to effectively carry dirt therefrom, means over which the belt is trained to form a pocket therein to receive and support the vegetables, means for directing a spray into the pocket, means to drive the belt whereby the vegetables will be tumbled or rotated in the pocket while sprayed, conveying lug means so mounted on the belt as to pass through said pocket at intervals to remove the washed vegetables from the pocket after repeated tumbling of the vegetables therein, and a drain pan under the pocket.

4. A vegetable washer comprising a belt through which water may drain to effectively carry dirt therefrom, means over which the belt is trained to form a pocket therein to receive and support the vegetables, means for directing a spray into the pocket, means to drive the belt whereby the vegetables will be tumbled or rotated by the combined action of the belt and gravity in the pocket while sprayed, means on the belt for periodically removing vegetables from the pocket after repeated tumbling thereof, and a drain pan under the pocket.

5. A vegetable washer comprising a belt from which water may drain to effectively carry dirt therefrom, means over which the belt is trained to form a pocket therein to receive and support the vegetables, means for directing a spray into the pocket, means to drive the belt whereby the vegetables will be tumbled or rotated due to the combined action of the belt and gravity in the pocket while sprayed, automatic means for periodically removing vegetables from the pocket after repeated tumbling thereof, and a tray having a draining bottom to receive the washed vegetables from the belt.

6. A vegetable washer comprising a belt from which water may drain to effectively carry dirt therefrom, means over which the belt is trained to form a pocket therein to receive and support the vegetables, means for directing a spray into the pocket, means to drive the belt whereby the vegetables will be tumbled or rotated by the combined action of the belt and gravity in the pocket while sprayed, and means for periodically sweeping the vegetables from the pocket after repeated tumbling thereof.

7. A vegetable washer comprising a belt through which water may drain to effectively carry dirt therefrom, means over which the belt is trained to form a pocket therein to receive and support the vegetables, means for directing a spray into the pocket, means to drive the belt whereby the vegetables will be tumbled or rotated due to the action of the belt and gravity in the pocket while sprayed, and conveying lug means mounted on the belt to periodically pass through said pocket to remove the washed vegetables from the pocket after repeated tumbling thereof.

8. A vegetable washer comprising a belt from which water may drain to effectively carry dirt therefrom, means over which the belt is trained to form a pocket therein to receive and support the vegetables, means for directing a spray into the pocket, means to drive the belt whereby the vegetables will be tumbled or rotated in the pocket while sprayed due to gravity and the movement of the belt, and means for periodically removing vegetables from the pocket in the direction of movement of the belt after repeated tumbling thereof.

CHARLES L. DALLINGA.